(12) United States Patent
Takebayashi

(10) Patent No.: US 6,992,793 B2
(45) Date of Patent: Jan. 31, 2006

(54) IMAGE FORMING APPARATUS AND ITS CONTROL METHOD

(75) Inventor: Manabu Takebayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 962 days.

(21) Appl. No.: 09/897,032

(22) Filed: Jul. 3, 2001

(65) Prior Publication Data
US 2002/0001092 A1 Jan. 3, 2002

(30) Foreign Application Priority Data
Jul. 3, 2000 (JP) ............................... 2000-200966

(51) Int. Cl.
G06F 15/00 (2006.01)

(52) U.S. Cl. .......................... 358/1.2; 358/1.9; 358/1.6

(58) Field of Classification Search ................. 358/1.2, 358/1.9, 296, 1.6, 447, 450–452, 537, 538
See application file for complete search history.

(56) References Cited

U.S. PATENT DOCUMENTS

| 6,411,402 | B1 * | 6/2002 | Sakaki et al. | 358/1.9 |
| 6,445,467 | B1 * | 9/2002 | Sakaki et al. | 358/1.9 |
| 6,515,762 | B2 * | 2/2003 | Noguchi | 358/1.9 |
| 6,822,761 | B2 * | 11/2004 | Sakaki et al. | 358/1.9 |

* cited by examiner

*Primary Examiner*—Twyler Lamb
(74) *Attorney, Agent, or Firm*—Fitzpatrick, Cella, Harper & Scinto

(57) ABSTRACT

An appending method is determined based on the first print density value detected by a printer engine to control switching of the appending method and an add-on pattern, an optimal add-on pattern can be appended by an optimal method.

16 Claims, 15 Drawing Sheets

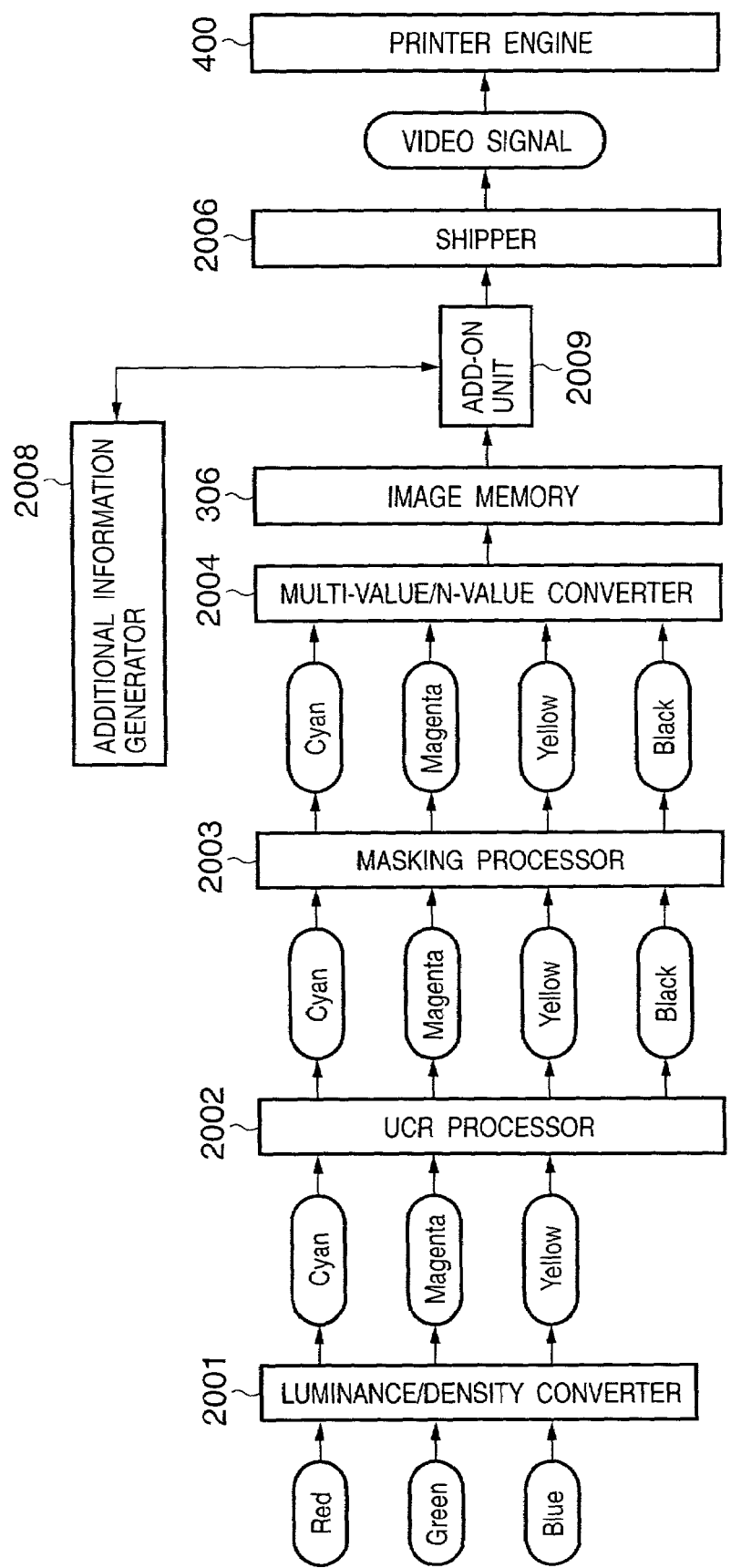

ents of the invention and, together with the description,
IMAGE FORMING APPARATUS AND ITS CONTROL METHOD

FIELD OF THE INVENTION

The present invention relates to an image forming apparatus for forming an image by appending additional information to image information, and its control method.

BACKGROUND OF THE INVENTION

Conventionally, a color printer, color copying machine, color facsimile, and the like have been put into practice as image forming apparatuses for printing color images.

In recent years, a price reduction and image quality improvement of these color image forming apparatuses, and development and proliferation of a peripheral device and computer for inputting image information, and image processing software for editing image information are striking. As a result, an image forming system that combines these apparatuses may easily copy an image of paper money, security, or the like, which should not be printed personally.

To solve such problem, a method of appending information indicating, e.g., the manufacture number of an image forming apparatus or the like to a print image in a format imperceptible to the human eye by the image forming apparatus, and specifying the image forming apparatus by recognizing the manufacture number from the print image later as needed has been proposed.

However, the conventional image forming apparatus appends additional information in consideration of only the image density designated by print image information. That is, information is appended by a single method even when the image density to be formed actually is different from the density designated by print image information due to the individual difference, aging, or the like of the apparatus, or when the print density designated by print image information is different from the image density to be formed actually since the user has designated the print density.

For this reason, the appended information may appear as considerable noise in a print image, or it may become difficult to detect additional information from a print image.

SUMMARY OF THE INVENTION

The present invention has been proposed to solve the conventional problems, and has as its object to provide an image forming apparatus which appends additional information to image information so as not to deteriorate image quality and to more reliably allow decoding of the additional information at a later time.

According to the present invention, the foregoing object is attained by providing an image forming apparatus having image forming means for forming an image on the basis of input image information, comprising:

a plurality of appending means for appending predetermined additional information to the input image information respectively by different methods;

density characteristic acquisition means for acquiring density characteristics of an image formed by the image forming means; and selection means for selecting one of the plurality of appending means on the basis of the acquired density characteristics.

In accordance with the present invention as described above, predetermined additional information can be appended by an optimal method in accordance with the density characteristics of image forming means.

The foregoing object is attained by further providing instruction input means for inputting a user's instruction, and wherein the density characteristic acquisition means acquires the density characteristics on the basis of a density value set by the user's instruction.

In accordance with the present invention as described above, predetermined additional information can be appended by a method chosen by the user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a schematic diagram showing the sequence of an information appending process in a video controller 300;

DETAILED DESCRIPTION OF THE PREFERRED EMBODIMENTS

Preferred embodiments of the present invention will now be described in detail in accordance with the accompanying drawings.

<First Embodiment>

System Arrangement

Figure 1:
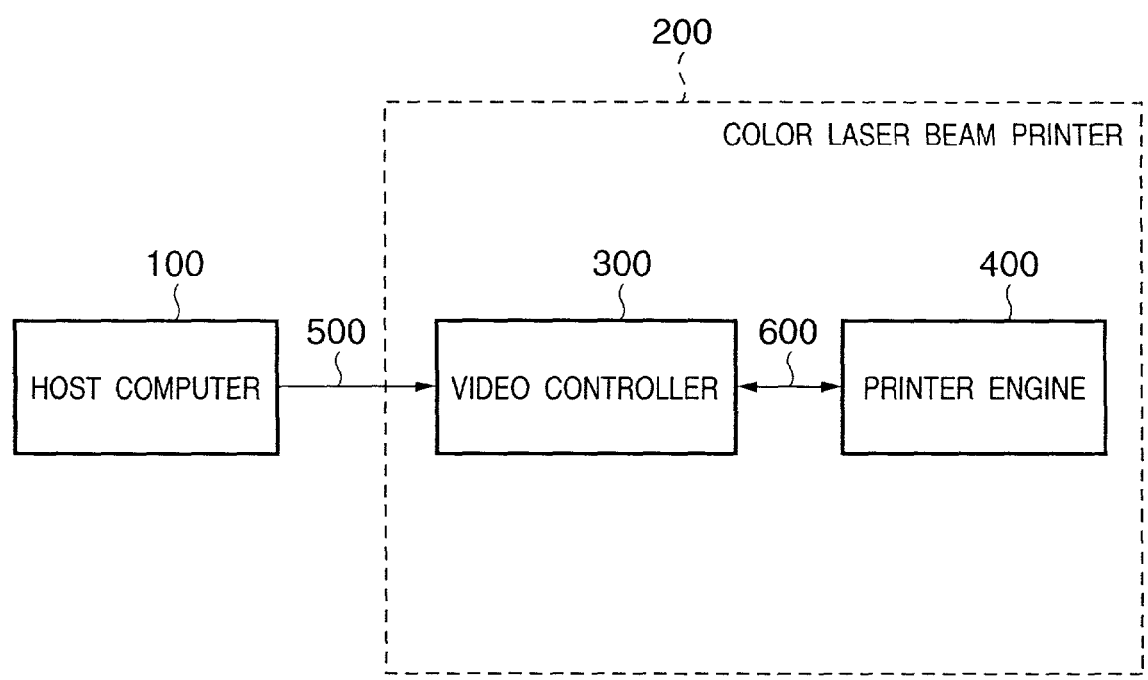
FIG. 1 is a schematic block diagram showing the arrangement of a color laser beam printer system according to an embodiment of the present invention.

FIG. 1 schematically shows the arrangement of an image forming system of this embodiment. Referring to FIG. 1, reference numeral 100 denotes a host computer; and 200, a color laser beam printer (to be simply referred to as a printer 200 hereinafter). In the printer 200, reference numeral 300 denotes a video controller; and 400, a printer engine. The video controller 300 and printer engine 400 are connected via a video interface 600. The host computer 100 and video controller 300 are connected via a host interface 500.

The print operation in this system will be explained below.

When application software on the host computer 100 starts to print in response to a user's instruction, a print command is sent to the color laser beam printer 200 via the host interface 500. More specifically, the application software generates a print command having a command system complying with a screen rendering command, and passes that print command to a printer driver for the printer 200 installed in the host computer. The printer driver generates a print command based on a printer language system that the printer 200 can interpret on the basis of the received print command.

The print command generated in this way is sent to the video controller 300 in the printer 200 via the host interface 500. Note that the host interface 500 comprises a physical cable complying with a given interface standard such as Centronics interface, RS-232C interface, Ethernet interface, or the like, or a radio wave including infrared rays or the like. The host interface 500 logically comprises a predetermined communication sequence called a protocol.

The video controller 300 interprets the received print command to generate raster image information. The generated raster image information is sent to the printer engine 400 via the video interface 600. The printer engine 400 receives 8-bit data per pixel at a resolution of 600 DPI, and prints the incoming raster image information on a print sheet using color toner.

Signals on Video Interface

Figure 2:
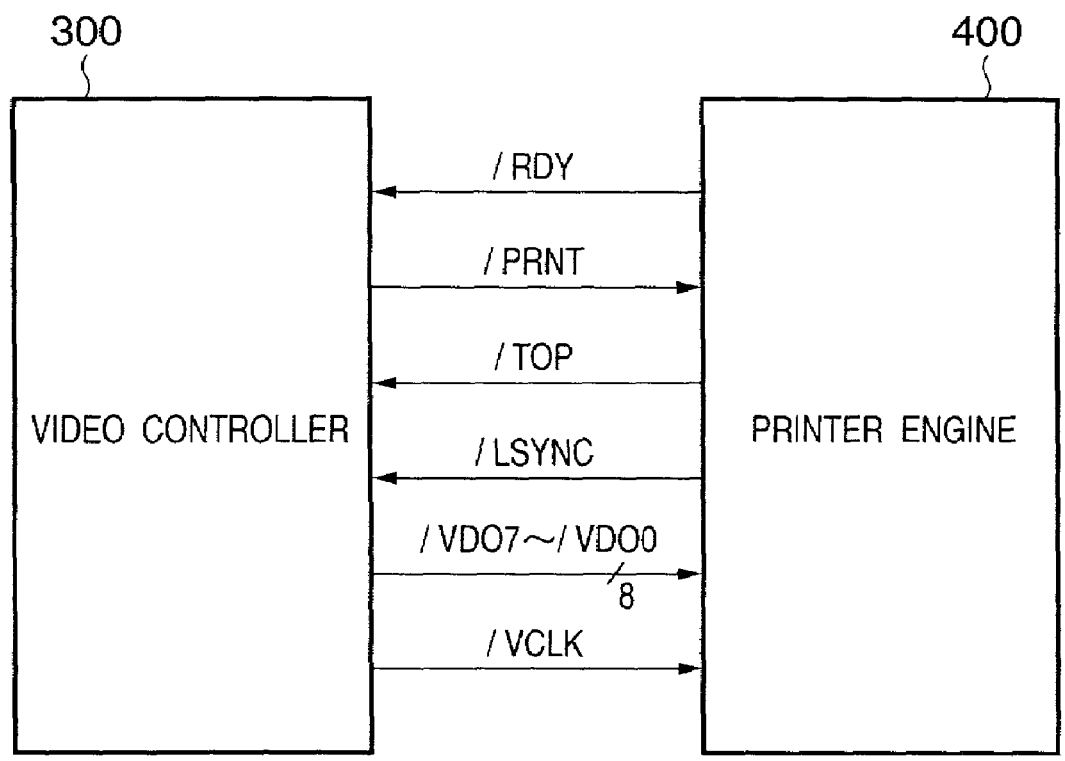
FIG. 2 shows video interface signals.

Signals on the video interface 600 that connects the video controller 300 and printer engine 400 will be described below with reference to FIG. 2. FIG. 2 shows principal video interface signals.

A signal /RDY is output from the printer engine 400 to the video controller 300, and indicates that the printer engine 400 is ready to start a print process or to continue a print process if it receives a signal /PRNT (to be described below).

A signal /PRNT is sent from the video controller 300 to the printer engine 400, and instructs to start or continue a print process.

A signal /TOP is a sync signal in the sub-scan (vertical scan) direction, which is output from the printer engine 400 to the video controller 300.

A signal /LSYNC is a sync signal in the main scan (horizontal scan) direction, which is output from the printer engine 400 to the video controller 300.

Signals /VDO7 to /VDO0 are image signals, which are output from the video controller 300 to the printer engine 400, and indicate image density information to be printed by the printer engine 400. The image signals are expressed by 8 bits having /VDO7 as the most significant bit, and /VDO0 as the least significant bit. The printer engine 400 prints at the maximum density of color toner used in development when the signals /VDO7 to /VDO0 indicate 00H, and prints no image when they indicate FFH.

A signal /VCLK is a transfer clock signal of the signals /VDO7 to /VDO0, and is output from the video controller 300 to the printer engine 400. The video controller 300 outputs signals /VDO7 to /VDO0 in synchronism with the leading edge of the signal /VCLK.

Video Controller Arrangement

The operation of the video controller 300 in this embodiment will be described below.

Figure 3:
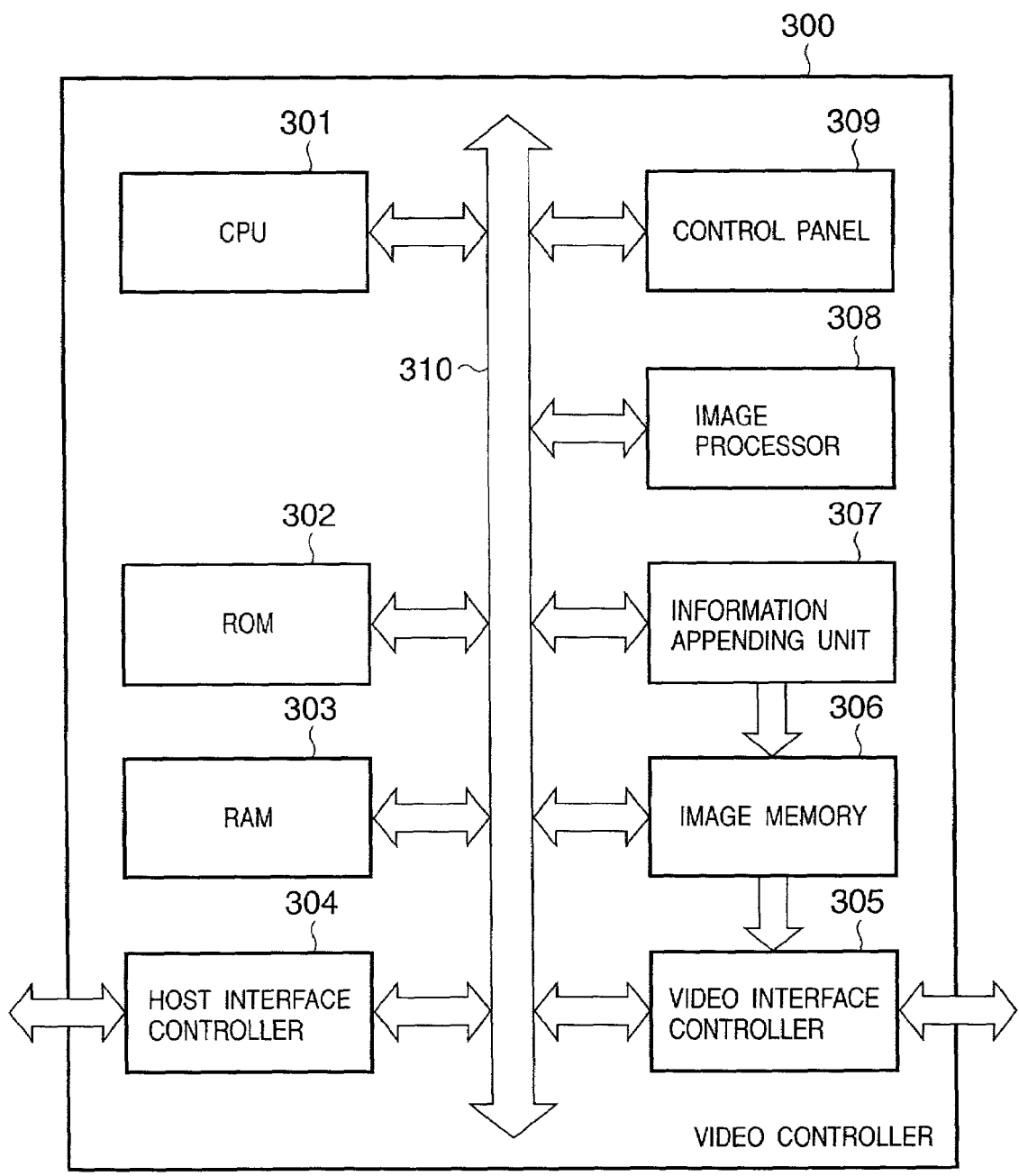
FIG. 3 is a block diagram showing the arrangement of a printer controller.

FIG. 3 is a block diagram showing the hardware arrangement of the video controller 300. Referring to FIG. 3, reference numeral 301 denotes a CPU for controlling functions of the printer by controlling the overall color laser beam printer 200, and controlling communications via a host interface 304 and video interface 305. Reference numeral 302 denotes a ROM which stores a control program of the CPU 301, font data, and the like. Reference numeral 303 denotes a RAM used as a work area or the like of the CPU 301.

Reference numeral 304 denotes a host interface controller which connects the host computer 100 to make one- or two-way communications from the host computer 100 to the printer 200, and receives a print command described in a language unique to the printer 200 and sends the status of the printer 200. Reference numeral 305 denotes a video interface controller which is an interface circuit with the printer engine 400.

Reference numeral 306 denotes an image memory for storing 8-bit, 600 DPI raster image data for one page in correspondence with each of magenta (M), cyan (C), yellow (Y), and black (K) color toners for the print process.

Reference numeral 307 denotes an information appending unit for appending predetermined additional information (to be referred to as an add-on pattern hereinafter) to print image data stored in the image memory 306. The process in the information appending unit 307 will be described in detail later.

Reference numeral 308 denotes an image processor for generating print raster image data on the basis of the input print command. Reference numeral 309 denotes a control panel, with which the user can directly make various setups of the printer 200. Reference numeral 310 denotes a bus which is used to exchange data between storage devices such as the ROM 302, RAM 303, and the like, and input/output devices such as the host interface 304, video interface 305, and the like.

In the above arrangement, a print command, which is input from the host interface 304 and is described in a language unique to the printer 200, is interpreted by the image processor 308 to be rasterized to obtain raster image data by a predetermined rendering algorithm. The raster image data are stored in the image memory 306. At this time, the print command is rasterized to obtain M, C, Y, and K 600 DPI raster image data, each of which consists of 8 bits per pixel. After the information appending unit 307 appends an add-on pattern to the raster image data in the image memory 306, the raster image data in the image memory 306 are sent to the printer engine 400 via the video interface controller 305.

Printer Engine Arrangement

The printer engine 400 in the printer 200 will be described in detail below. In this embodiment, the engine arrangement of a color laser beam printer which obtains a color image by forming a plurality of color images that overlap each other on a print sheet by repeating the process for transferring an image formed on an image carrier via charging, exposure, and development processes onto the print sheet a plurality of number of times will be described.

Figure 4:
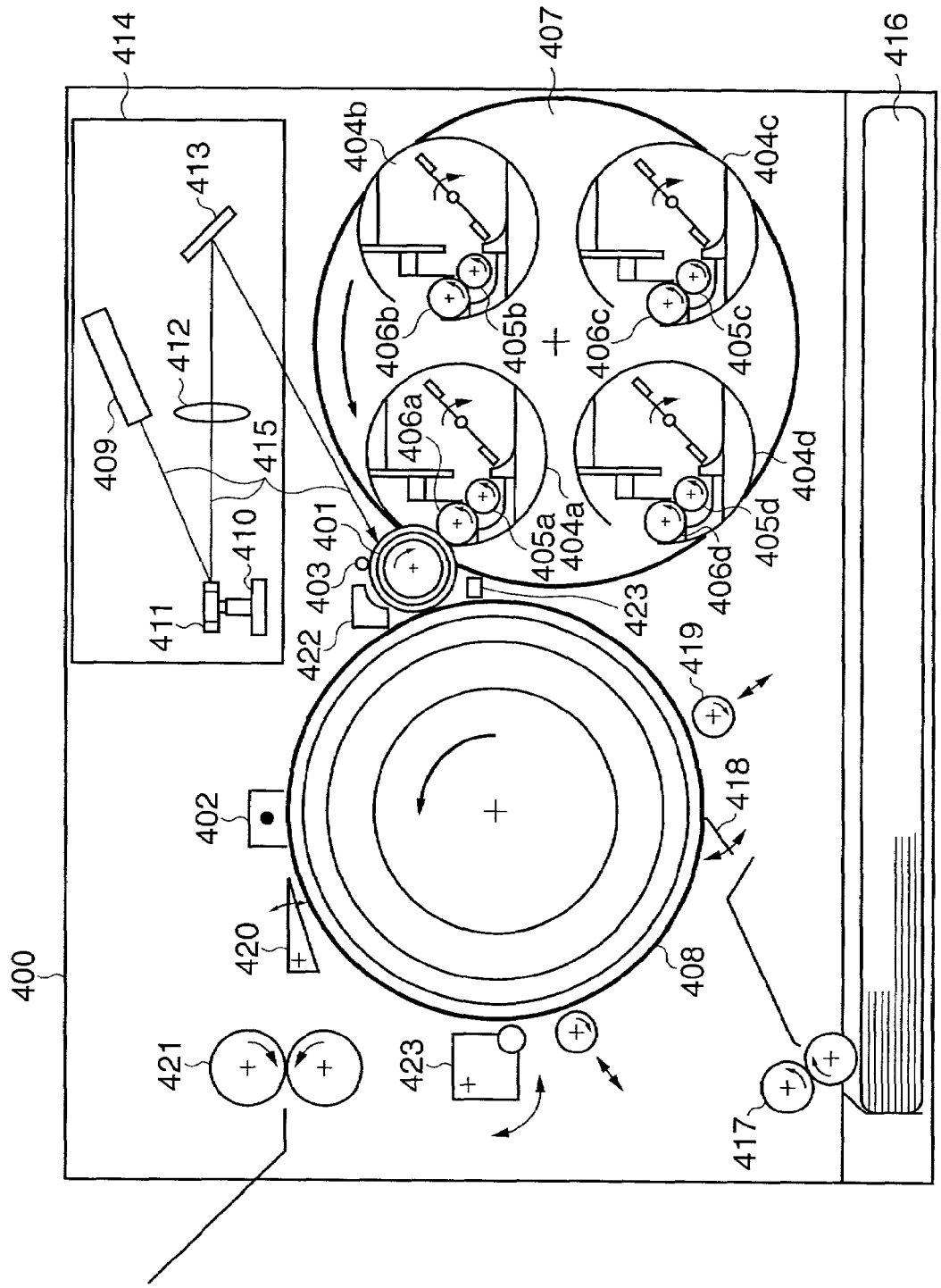
FIG. 4 is a longitudinal sectional view showing the arrangement of a printer engine.

FIG. 4 is a longitudinal sectional view of the printer engine 400. As shown in FIG. 4, the engine comprises a photosensitive drum 401, corona charger 402, and roller charger 403. On the right side of the photosensitive drum

401, a plurality of developers 404a, 404b, 404c, and 404d are supported by a rotatable support member 407, and the developing aperture surfaces of the developers 404a, 404b, 404c, and 404d are set on a single cylinder having the rotational shaft of the support member as the center. The developers 404a, 404b, 404c, and 404d respectively store yellow, magenta, cyan, and black toners, and include apply rollers 405a, 405b, 405c, and 405d. Upon rotation of developing rollers 406a, 406b, 406c, and 406d, toners are applied onto the developing rollers 406a, 406b, 406c, and 406d by the toner apply rollers 405a, 405b, 405c, and 405d. The developers 404a, 404b, 404c, and 404d attached to the rotational shaft of the support member 407 are driven so that their developing aperture surfaces always face the photosensitive drum surface.

On the left side of the photosensitive drum 401, a transfer roller 408 having a function of holding a transfer sheet, and transferring an image on the photosensitive drum 401 onto the transfer sheet is arranged. A density sensor 423 is arranged below the photosensitive drum 401. The density sensor 423 detects the density of an image formed on the photosensitive drum 401, and provides the detection result to an information appending process (to be described later).

With the above arrangement, the photosensitive drum 401 is driven by a drive means (not shown) in the direction of an arrow in FIG. 4.

An optical unit 414 which comprises a semiconductor laser 409 that forms an exposure device, a polygonal mirror 411 rotated by a high-speed motor 410, a lens 412, and a return mirror 413 is arranged in the upper portion of the engine main body.

A case will be explained below wherein a signal according to, e.g., a yellow print image is input to the semiconductor laser 409.

The photosensitive drum 401 is irradiated with a laser beam oscillated by the semiconductor laser 409 in accordance with the input signal via an optical path 415. When the photosensitive drum 401 rotates in the direction of the arrow, a latent image on the drum 401 is visualized by one of the developers 404a, 404b, 404c, and 404d. In synchronism with the image on the photosensitive drum 401, a transfer sheet is fed from a transfer cassette 416 by pickup rollers 417. When the transfer sheet is fed to the transfer roller 408, it is held by a gripper 418, and a toner image on the photosensitive drum 401 is transferred onto the transfer sheet by a voltage across the photosensitive drum 401 and transfer roller 408. At the same time, by injecting charge to the transfer sheet (not shown), the transfer sheet is chucked on the transfer roller 408. Note that a voltage may be applied across chucking rollers 419 as needed to chuck the transfer sheet in advance.

By repeating the aforementioned process for magenta, cyan, and black, a plurality of toner images are formed on the transfer sheet. The print sheet is peeled from the transfer roller 408 by a separation pawl 420, and is fed to a heating or compression fixing device 421 to melt and fix the toner images, thus obtaining a color image.

The residual toner on the photosensitive drum 401 after transfer is cleaned by a cleaning device 422. Also, toner on the transfer roller 408 is cleaned by a transfer roller cleaning device 423 as needed.

Details of Exposure Method

Figure 5:
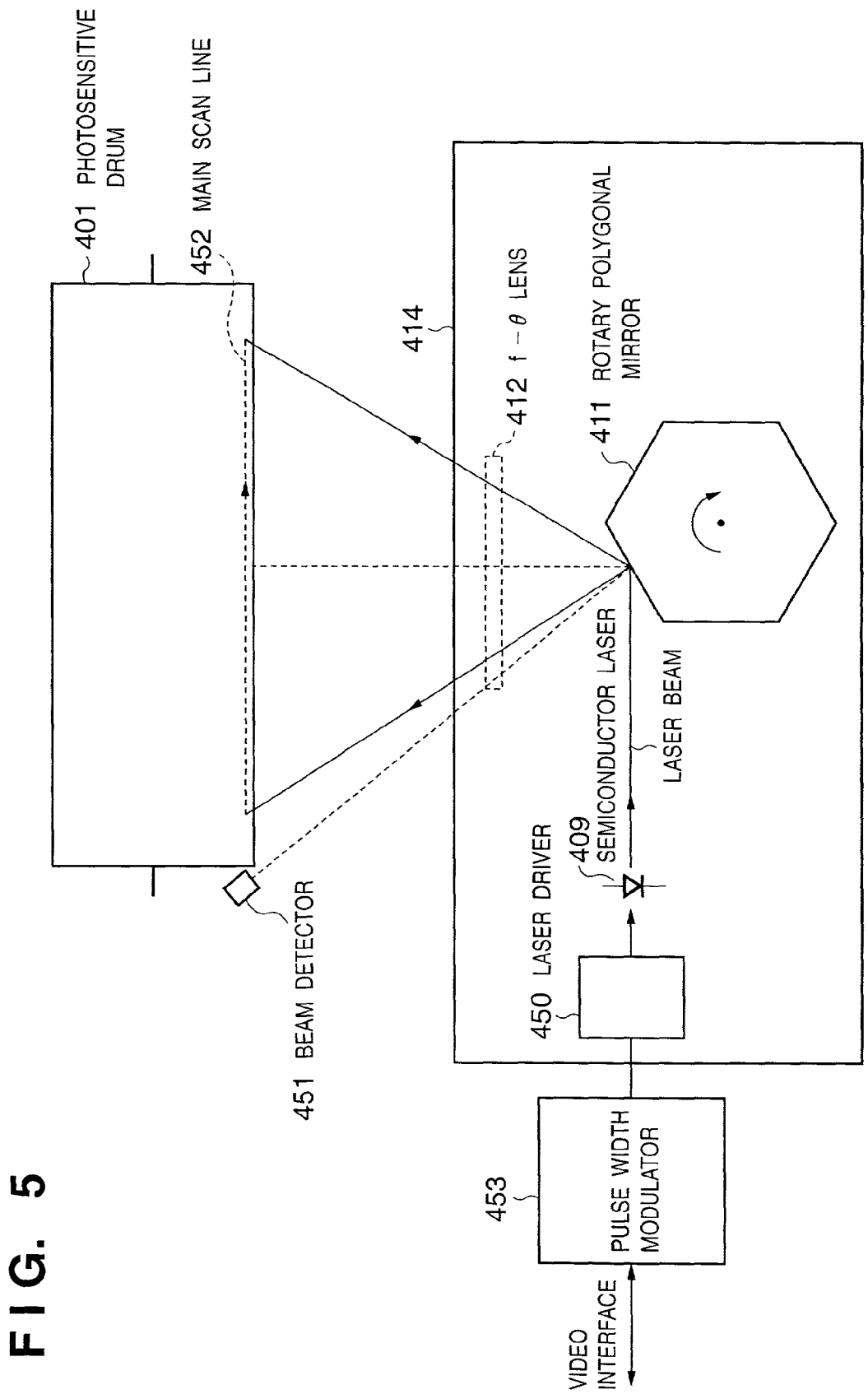
FIG. 5 shows an exposure method.

FIG. 5 is a view for explaining a method (exposure method) for forming an electrostatic image on the photosensitive drum 401 on the basis of an electrical signal in the printer engine 400.

Referring to FIG. 5, reference numeral 453 denotes a pulse width modulator for converting 8-bit image data signals /VDO7 to /VDO0 into a pulse width signal; 450, a laser driver for driving the semiconductor laser 409; 409, a semiconductor laser for converting an electrical signal into optical oscillation; 411, a rotary polygonal mirror for scanning a laser beam on the photosensitive drum; 412, an f-θ lens for focusing the laser beam on the photosensitive drum; 451, a beam detector for detecting the scan start of a main scan line; 452, a main scan line direction; and 401, a photosensitive drum on which an electrostatic image is formed.

Image data signals /VDO0 to /VDO0 sent to the printer engine 400 via the video interface 305 are converted into pulses corresponding to their values by the pulse width modulator 453.

In the optical unit 414, the semiconductor laser 409 is driven by the laser driver 450 in accordance with this pulse signal. A laser beam emitted by the semiconductor laser 409 is guided onto the photosensitive drum 401 via the f-θ lens 412 inserted between the rotary polygonal mirror 411 and photosensitive drum 401, forms an image on the photosensitive drum 401, and is scanned by the rotary polygonal mirror 411 in the main scan direction, thus forming a latent image on the main scan line 412. The beam detector 451 detects the scan start of the main scan line of the laser beam, and the signal /LSYNC as a sync signal used to determine the image write start timing in the main scan direction is generated based on the detection signal of the beam detector 451. The video controller 300 outputs the image data signals /VDO7 to /VDO0 to the printer engine 400 at predetermined timings with respect to the signal /LSYNC on the video interface 600, thus achieving a print process at a normal timing.

Basic Information Appending Technique

A basic method of appending an add-on pattern to color image data will be explained below. In this embodiment, one of a plurality of appending methods (to be described later) is selectable in addition to this basic method.

A case will be described below wherein two different add-on patterns are appended to color image data.

Figures 6A, 6B:
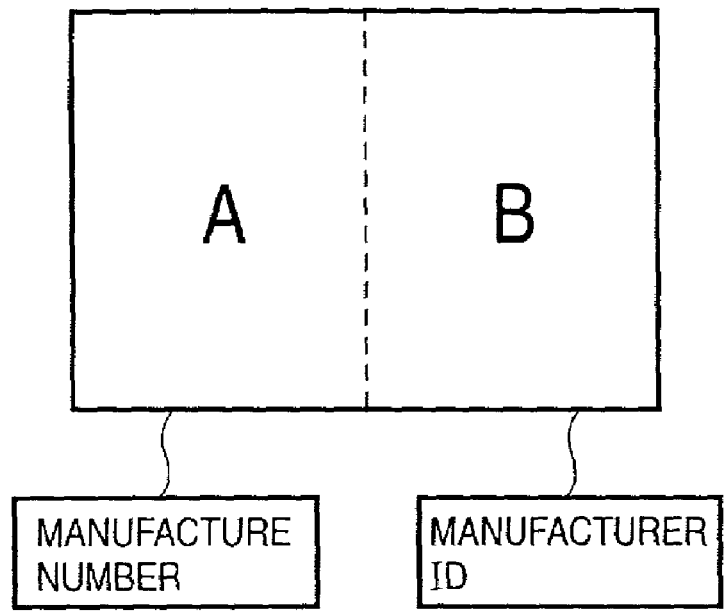
FIGS. 6A and 6B show the positional relationship of add-on patterns.

FIG. 6A shows an image for one page based on color image data, and the image is formed by two regions, i.e., a region A to which the manufacture number of an apparatus is appended, and a region B to which the ID of a manufacturer that manufactured the apparatus is appended. More specifically, a dot pattern indicating the manufacture number is embedded in the region A, and a dot pattern indicating the ID of the manufacturer that manufactured the apparatus is embedded. Details of these dot patterns will be explained later. Note that the positional relationship in one image to which these two different add-on patterns are appended can be designed as needed, and is not limited to the example shown in FIG. 6A. For example, an image may be broken up into a larger number of regions, and regions A and B may be alternately arranged, as shown in FIG. 6B.

A technique for appending these add-on patterns to be imperceptible to the human eye will be explained below. Note that a process for appending an add-on pattern to multi-valued (n-valued) color image data will be explained. As described above, input color image data consists of Y, M, C, and K color components, and an add-on pattern is appended to not all the color components but some color components. In this embodiment, a process for appending an add-on pattern to only a Y component since especially the Y component is least perceptible to the human eye will be exemplified.

The configuration of an add-on pattern to be appended in this embodiment will be described below.

The add-on pattern of this embodiment is formed by a sequence of a plurality of unit dots, each consisting of a plurality of pixels, at a predetermined spacing, and can express information of several bits by the phase difference between neighboring unit dots.

Figure 7:
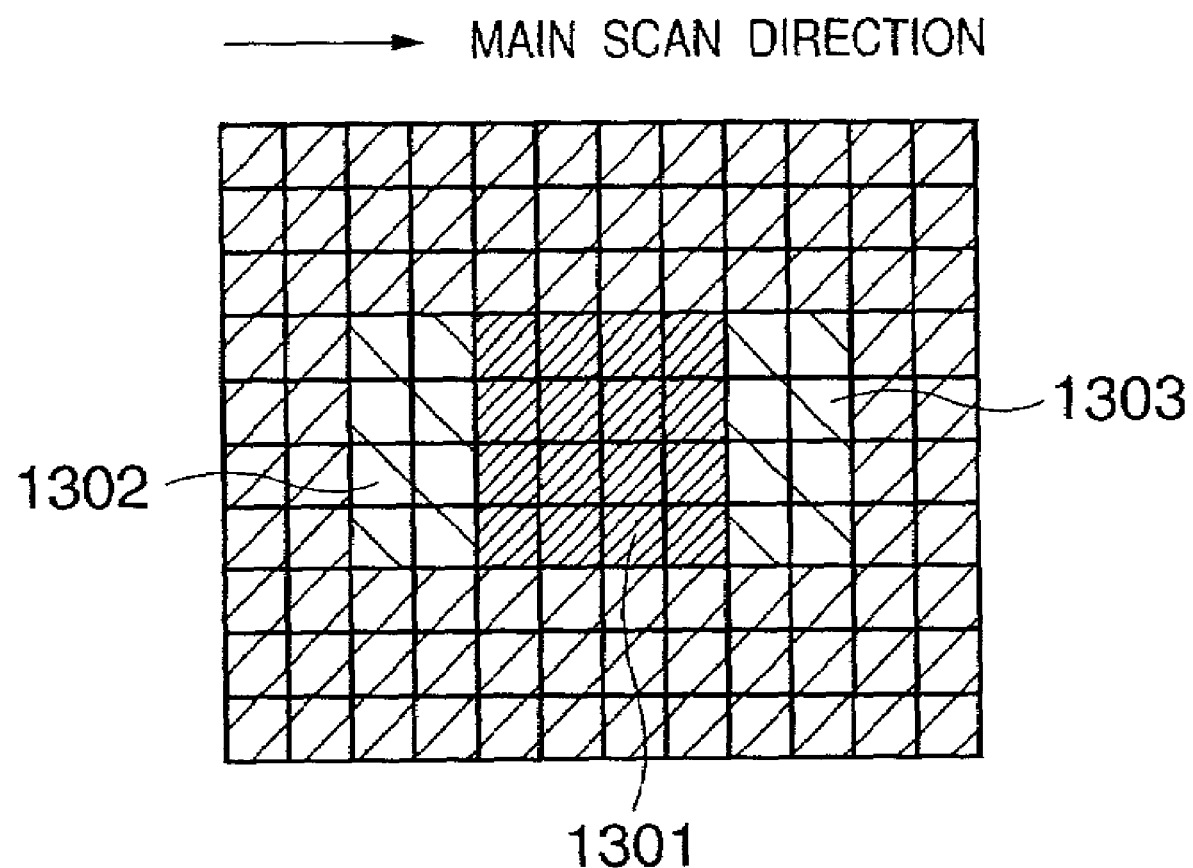
FIG. 7 shows an example of the configuration of unit dots.

FIG. 7 shows the configuration of a unit dot. The unit dot shown in FIG. 7 is comprised of a total of 32 pixels in three regions 1301 (8 pixels), 1302 (16 pixels), and 1303 (8 pixels). In FIG. 7, 4×4 pixels in the region 1301 undergo modulation for increasing the density of a source image (yellow component of image data) by α. On the other hand, 16 pixels in the regions 1302 and 1303 (the total of the numbers of pixels in the two regions is equal to the number of pixels in the region 1301) undergo modulation for decreasing the density of the source image (yellow component of image data) by α. Note that the region around the unit dot does not undergo density modulation. With this modulation process, the actual density of an image is preserved at positions before and after modulation.

In this manner, since the unit dot is embedded in the Y component, and the image density is preserved at positions before and after the embedded position of the unit dot, it is very difficult for the human eye to recognize the embedded unit dot. However, this unit dot can be decoded if a dedicated decoder is used.

Figure 8:
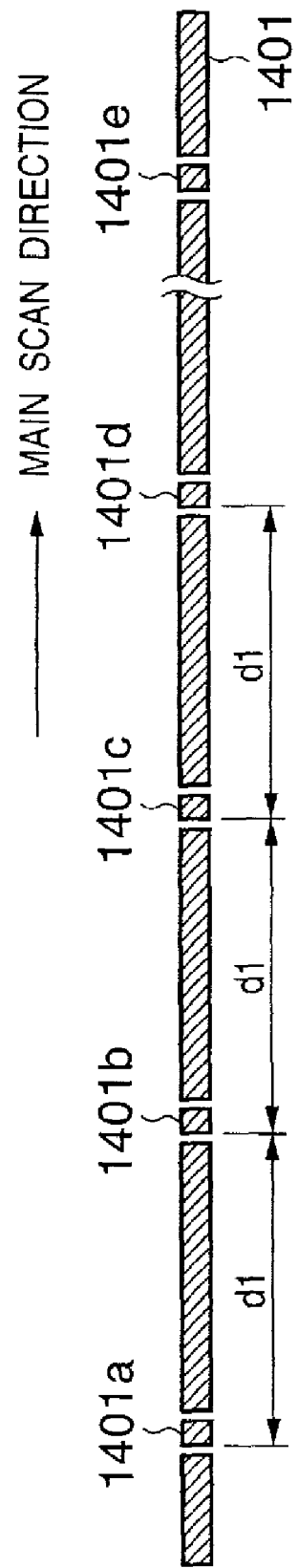
FIG. 8 shows an example of additional information expression by a sequence of a plurality of unit dots.
Figure 9:
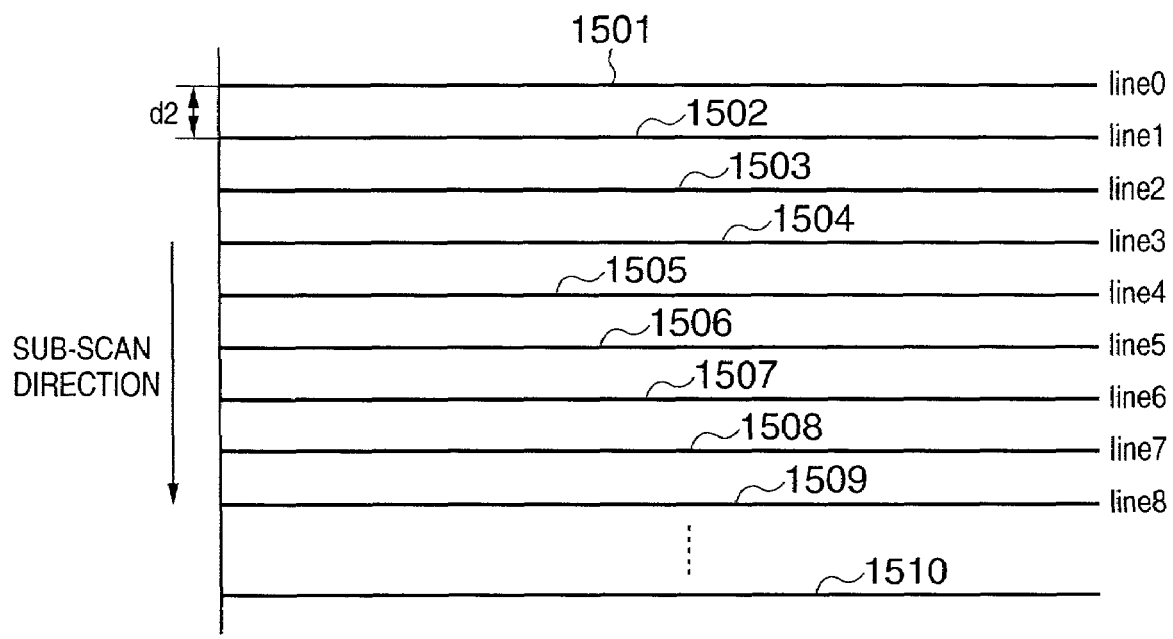
FIG. 9 shows an example of additional information expression by a sequence of a plurality of unit dots.

FIGS. 8 and 9 are views for explaining an expression method of additional information contents by an add-on pattern defined by a sequence of a plurality of unit dots.

Referring to FIG. 8, reference numeral 1401 denotes an add-on line to which unit dots are to be appended (this line has a 4-pixel width which is the same as the width of the unit dot). A plurality of add-on lines are present in an image. Reference numerals 1401a to 1401e denote unit dots arranged on the single add-on line 1401. These unit dots 1401a to 1401e are arranged at a predetermined period corresponding to a spacing d1 (e.g., 128 pixels). Note that this embodiment does not express additional information by the phase difference between unit dots on a single add-on line, but merely exemplifies an operation for periodically embedding an add-on pattern.

Referring to FIG. 9, reference numerals 1501 to 1510 denote a plurality of add-on lines which are arranged in the sub-scan direction at a predetermined period corresponding to a spacing d2 (e.g., 16 pixels).

As will be described in detail later, if 4-bit information can be expressed by the phase difference between unit dots between two add-on lines, and the nine add-on lines 1501 to 1509 form a dot pattern (add-on pattern) for one unit (the minimum number of lines required to completely express additional information), additional information of a total of 32 bits (manufacturer ID, manufacture number, or the like) can be expressed. That is, add-on patterns each defined by a combination of the nine add-on lines 1501 to 1509 are periodically embedded.

Note that the add-on pattern for one unit is independently embedded in each of the regions A and B shown in FIG. 6A or 6B. For example, in the example shown in FIG. 6A, information of a total of 64 bits (=32+32) is embedded in one image.

Figure 10:
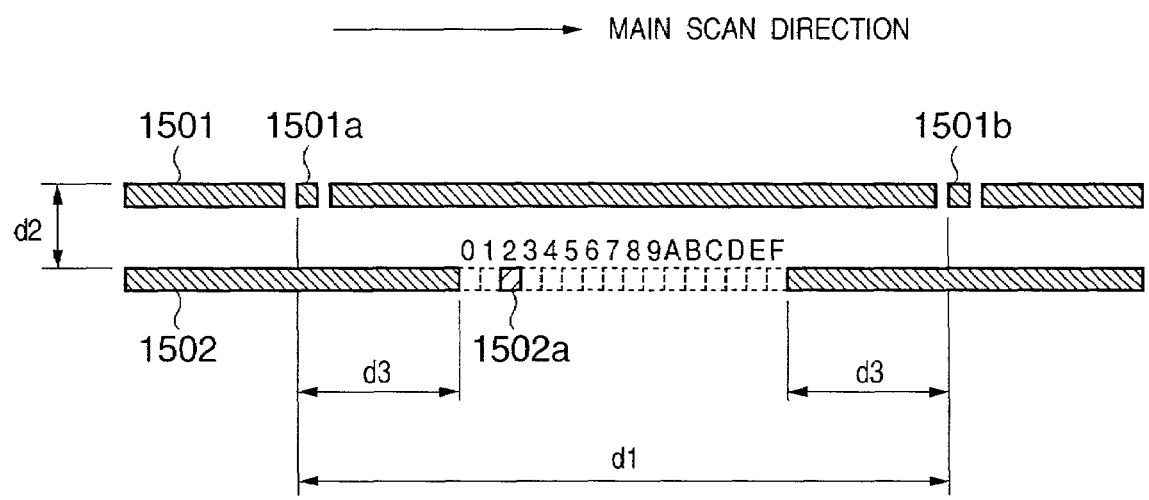
FIG. 10 shows an example of additional information expression by a sequence of a plurality of unit dots.
Figure 11A:
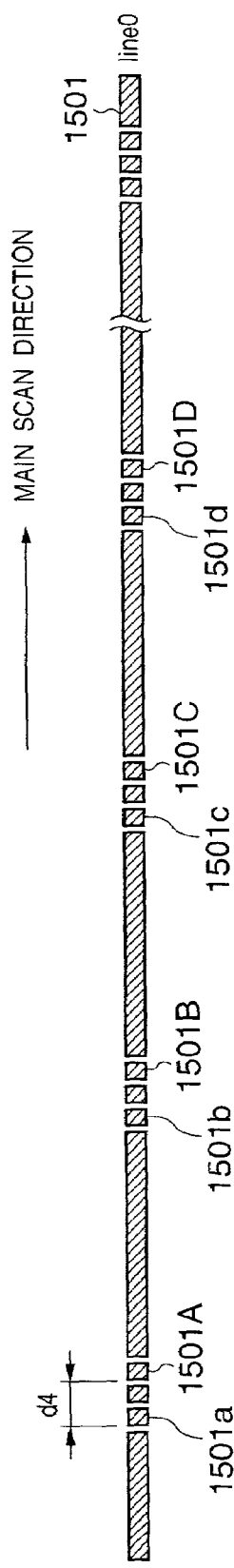
FIGS. 11A and 11B show examples of additional information expression by a sequence of a plurality of unit dots.
Figure 11B:
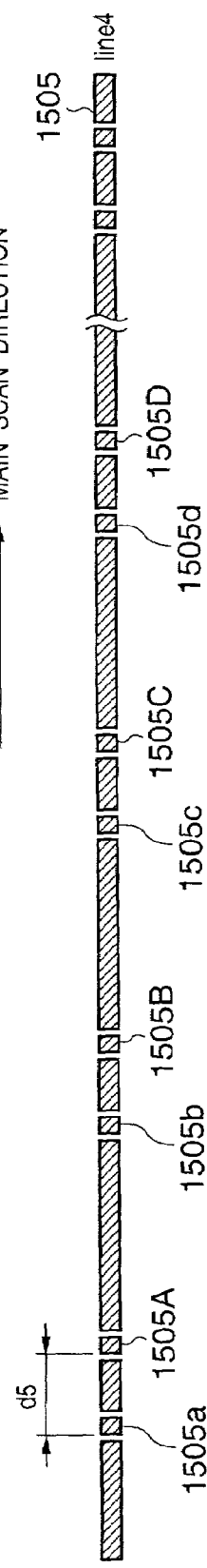

FIGS. 10, 11A and 11B are views for explaining how to express 4-bit information by unit dots on add-on lines.

Referring to FIG. 10, reference numerals 1501 and 1502 denote neighboring add-on lines (line 0, line 1) in FIG. 9. Assume that the spacing between each of unit dots 1501a and 1501b on the upper line 1501, and a unit dot 1502a on the lower unit 1502 is at least d3 (e.g., 32 pixels) in the main scan direction. This is to prevent an add-on pattern from being easily recognized by the human eye when unit dots on the upper and lower add-on lines 1501 and 1502 approach each other in the main scan direction (vertically align).

The phase difference between the unit dots 1501a and 1502a shown in FIG. 10 is decoded as follows. In this case, the unit dot 1502a is appended at a position corresponding to "2" of phase differences corresponding to "0" to "F" with respect to the unit dot 1501a after the spacing d3. Therefore, these two add-on lines expresses information "2", i.e., "0010" in binary notation.

FIGS. 11A and 11B show the states wherein reference dots used to specify the head of an add-on line and the order (vertical relationship) of add-on lines are appended.

Referring to FIGS. 11A and 11B, reference numerals 1501 and 1505 denote add-on lines (line 0, line 4) in FIG. 9. On the add-on line 1501 (0th line) as the head line, reference dots 1501A to 1501D are appended on the right side of all unit dots 1501a to 1501d of a pattern that indicates information to be appended, so as to be separated by d4 (e.g., 16 pixels). These reference dots 1501A to 1501D indicate that the add-on line of interest is the head line.

Likewise, on the add-on line 1505 (fourth line), reference dots 1505A to 1505D are appended on the right side of all unit dots 1505a to 1505d to be separated by d5 (e.g., 32 pixels). These reference dots 1504A to 1505D can specify that the add-on line of interest is the fourth add-on line of nine lines.

In this way, since the 0th and fourth lines are specified, the order (vertical relationship) of all the nine add-on lines can be consequently specified.

Note that the aforementioned basic information appending method can be applied to n-valued color image data.

Outline of Information Appending Method in this Embodiment

An information appending technique as a characteristic feature of this embodiment will be explained in detail below.

A schematic arrangement for appending information will be explained first. FIG. 12 is a diagram for explaining a schematic processing sequence upon appending an add-on pattern to print data especially by the information appending unit 307 during a process for generating print data in the video controller 300 and outputting the print data to the printer engine 400. Note that this process is controlled by the CPU 301 in the video controller 300.

Referring to FIG. 12, reference numeral 2001 denotes a luminance/density converter; 2002, a UCR processor; 2003, a masking processor; and 2004, a multi-value/N-value converter for executing dithering, error diffusion, and the like. These converters and processors are equipped in the image processor 308. Print image information rendered by these components is stored as print data in the image memory 306 mentioned above.

Reference numeral 2008 denotes an additional information generator for generating an add-on pattern to be appended to print data. The add-on pattern generated by the generator 2008 is appended to print data in the image memory 306 by an add-on unit 2009. The additional information generator 2008 and add-on unit 2009 are equipped in the information appending unit 307.

Reference numeral 2006 denotes a shipper for outputting print data after add-on as a video signal to the printer engine 400.

A print data generation method in this embodiment will be described in detail below.

A print command output from the host computer 100 normally includes rendering commands of a line, curve, paint, and the like, and these rendering commands are stored as a sequence of pixels in the image memory 306. That is, each rendering command designates the address of the image memory 306, and determines a value (pixel value) at that address.

In general, a rendering command designates a pixel value as R (red), G (green), and B (blue) luminance values. The luminance/density converter 2001 converts these R, G, and B values from luminance value information having additive mixing characteristics suitable for a display device of the host computer 100 into C (cyan), M (magenta), and Y (yellow) values as density information having subtractive mixing characteristics suitable for a printer (printer engine 400). Furthermore, the UCR processor 2002 generates K (black) information from the C, M, and Y values to print more accurate black. The masking processor 2003 executes color conversion in correspondence with the color characteristics of the printer engine 400. The multi-value/N-value converter 2004 converts input multi-valued information into information of coordinates and pixel values suitable for the printer. The N-valued information after the multi-value/N-value conversion process is stored as print data in the image memory 306.

When the video controller 300 issues a print start instruction command to the printer engine 400, the shipper 2006 sequentially reads out the print data from the image memory 306 and outputs the readout data to the printer engine 400 in accordance with the timing signal generated by the printer engine 400.

At this time, the additional information generator 2008 generates an add-on pattern on the basis of the coordinate positions and pixel values of the print data read out from the image memory 306, and an add-on method determined by the add-on unit 2009. The add-on unit 2009 modifies the print data read out from the image memory 306 on the basis of the add-on pattern generated by the additional information generator 2008, and sends the modified data to the shipper 2006.

Details of Information Appending Method

The add-on pattern appending method in this embodiment will be described in detail below. This embodiment is characterized by selecting an add-on pattern appending method on the basis of the print density of the printer engine 400.

Figure 13:
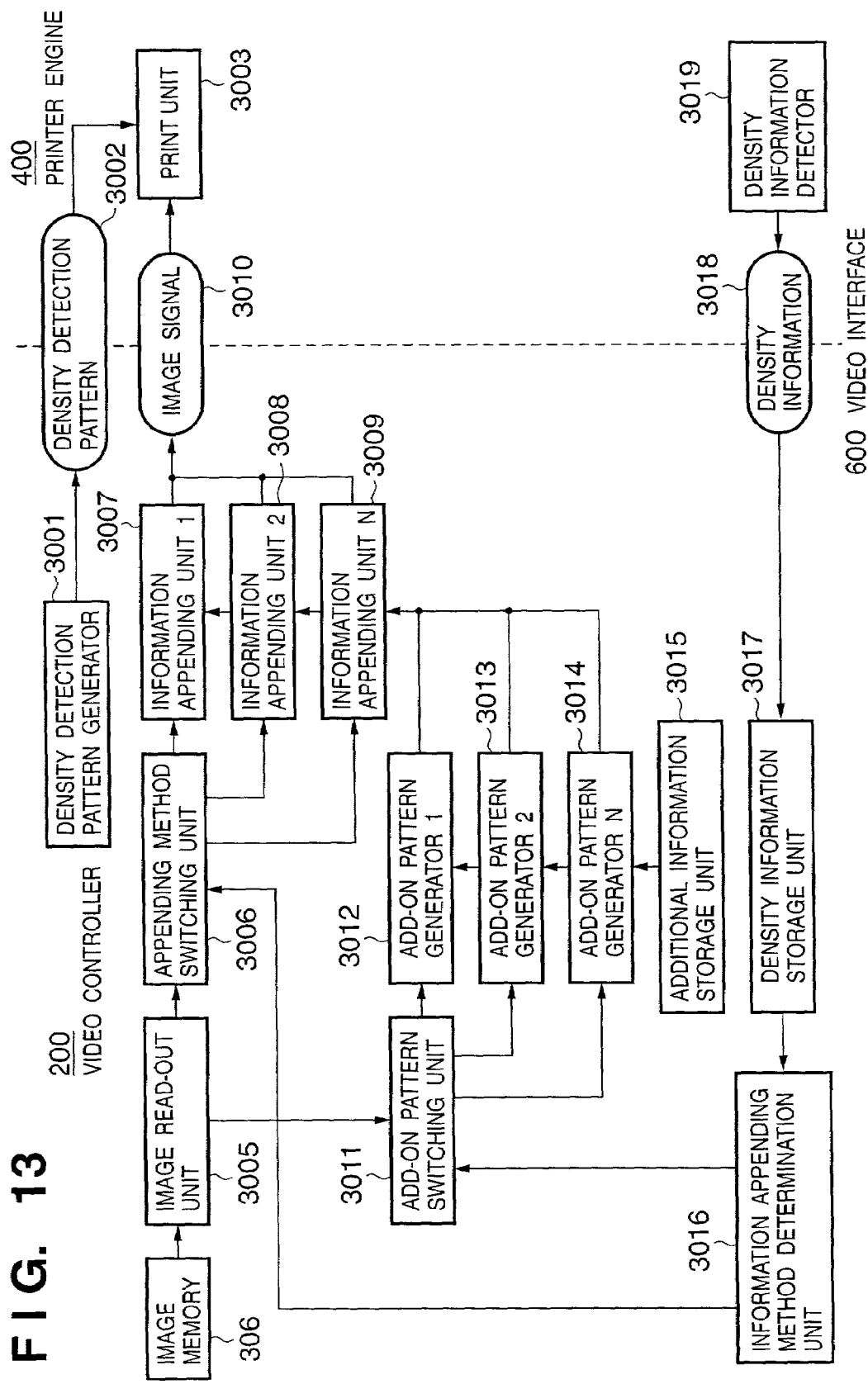
FIG. 13 is a diagram showing the sequence of the information appending process in detail.

FIG. 13 shows in detail the add-on pattern appending process sequence shown in FIG. 12 while dividing it into those of the video controller 300 and printer engine 400, and especially shows details of processes in the additional information generator 2008 and add-on unit 2009 shown in FIG. 12. The add-on pattern appending process according to this embodiment will be described in detail below with reference to FIG. 13.

Referring to FIG. 13, reference numeral 3001 denotes a density detection pattern generator in the video controller 300; 3002, a generated density detection pattern; and 3003, a print unit in the printer engine 400, which components are not shown in FIG. 12.

Reference numeral 3005 denotes an image read-out unit for reading out an image from the image memory 306; 3006, an appending method switching unit; and 3007 to 3009, information appending units for appending information (add-on pattern), which components are included in the add-on unit 2009 shown in FIG. 12. Note that reference numeral 3010 denotes an image signal appended with an add-on pattern.

Reference numeral 3011 denotes an add-on pattern switching unit for switching an add-on pattern to be appended; 3012 to 3014, add-on pattern generators; and 3015, an additional information storage unit for storing original information be appended as an add-on pattern, which components are included in the additional information generator 2008 shown in FIG. 12.

Reference numeral 3019 denotes a density information detector in the printer engine 400; 3018, density information; 3017, a density information storage unit in the video controller 300; and 3016, an information appending method determination unit. The information appending method determination unit 3016 and density information storage unit 3017 are included in the add-on unit 2009 shown in FIG. 12.

The density detection pattern 3002, image signal 3010, and density information 3018 are exchanged between the video controller 300 and printer engine 400 via the video interface 600.

The add-on pattern appending operation in the above arrangement will be described below. The video controller 300 sends a test image used to measure a plurality of density levels using the density detection pattern generator 3001 to the print unit 3003 in the printer engine 400 as the density detection pattern 3002 in accordance with a protocol determined between the printer engine 400 and video controller 300. The print unit 3003 forms an image on the photosensitive drum 401 to measure the print density, and the density information detector 3019 detects the density of the image formed on the photosensitive drum 401 using the density sensor 423. Furthermore, the density when that image is actually printed on a paper sheet is obtained (estimated) from a predetermined correspondence between the read value of the density sensor 423 and the density actually printed on a paper sheet on the basis of the density value measured by the density sensor 423.

The density information 3018 measured (estimated) by the density information detector 3019 is sent from the printer engine 400 to the video controller 300 via the video interface 600, and is stored in the density information storage unit 3017. Furthermore, the information appending method determination unit 3016 determines an appropriate information appending method on the basis of the density information stored in the density information storage unit 3017.

On the other hand, when the image read-out unit 3005 in the video controller 3005 reads out print data from the image memory 306, it sends that read-out position (coordinates) to the add-on pattern switching unit 3011. The image data read out by the image read-out unit 3005 is sent to an appropriate information appending unit (one of 3007 to 3009) by the appending information switching unit 3006, and is appended with an add-on pattern by a predetermined method. The print data appended with the add-on pattern is sent as the image signal 3010 to the print unit 3003 in the printer engine 400 via the video controller 600, and is printed on a paper sheet.

The add-on pattern determined by the information appending method determination unit 3016 is sent to the appending method switching unit 3006 and add-on pattern switching unit 3011.

The add-on pattern generators 3012 to 3014 generate an add-on pattern on the basis of the read-out position of the print data that the add-on pattern switching unit 3011 received from the image read-out unit 3005, and additional information (e.g., an encoded value of the manufacturer ID, manufacture number, or the like) stored in the additional information storage unit 3015. The generated add-on pattern is appended to the print data by one of the information appending units 3007 to 3009 determined by the appending method switching unit 3006 in accordance with the information appending method determined by the information appending method determination unit 3016.

Various Appending Methods

Various methods of appending an add-on pattern to print data by the information appending units 3007 to 3009 and add-on pattern generators 3012 to 3014 will be explained below.

Normally, the information appending method determination unit 3016 selects a method of appending an add-on pattern based on the density information stored in the density information storage unit 3017 to an image signal of a Y component which is hardest to recognize, as described above. However, for example, when the density information detector 3019 detects a low density value upon measuring the maximum density of the Y component on the basis of the density detection pattern formed by the print unit 3003, an add-on pattern cannot often be detected even when the pixel values in the regions 1303 and 1302 of the 8×4 pixels in the regions 1301 to 1303 shown in FIG. 7 are decreased by a fixed value α, and the pixel values in the region 1301 are increased by a fixed value α. That is, if an add-on pattern is appended based on a given density level despite a small maximum print density, it becomes difficult to detect that pattern.

Conversely, if an add-on pattern is appended based on a given density level even when the maximum print density is high, that add-on pattern may stand out depending on the print density characteristics of the printer engine 400, which change along with an elapse of time.

To solve such problem, in this embodiment, the information appending method determination unit 3016 selects one of the following appending methods ([1] to [5]) on the basis of the print density characteristics of the printer engine 400, thereby appending an add-on pattern to make its detection easier.

[1] The pixel values in the regions 1303 and 1302 in the unit dot shown in FIG. 7 are decreased by a value larger than that used normally, and the pixel values in the region 1301 are also increased by a value larger than that used normally to raise contrast, thus making an add-on pattern easier to detect.

Figure 14:
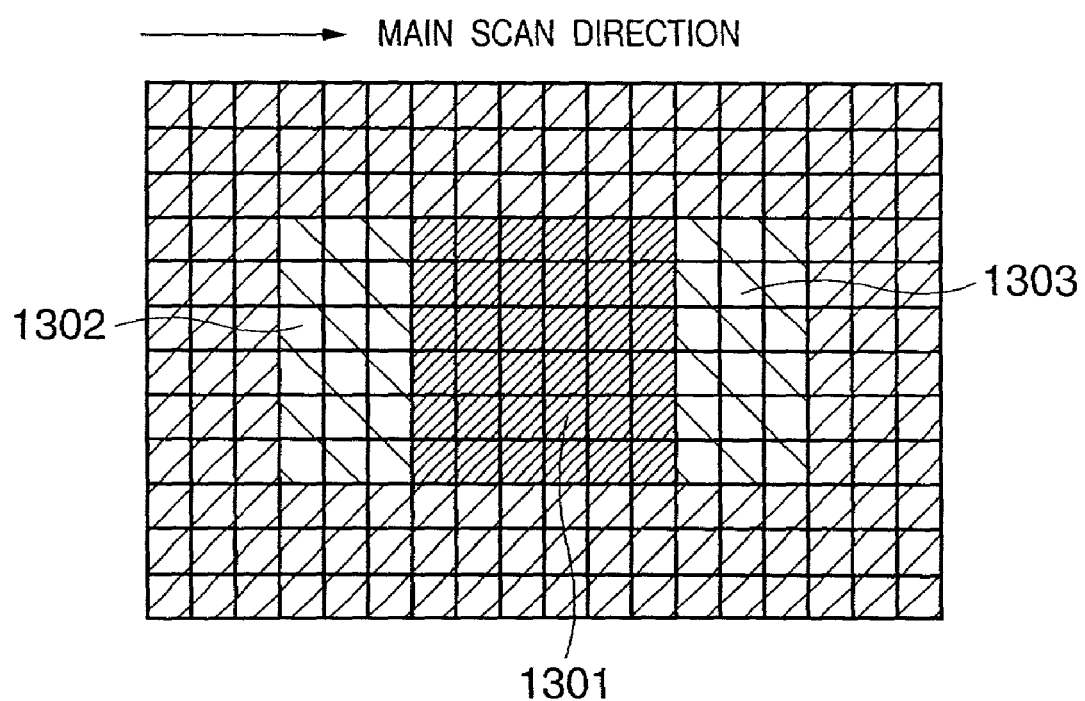
FIG. 14 shows an example of the configuration of unit dots.

[2] The size or shape of the unit dot is changed. For example, the unit dot is formed by increasing the number of pixels in the regions 1301 to 1303 shown in FIG. 7 to make an add-on pattern easier to detect. FIG. 14 shows an example of the unit dot formed by a total of 72 pixels.

[3] If the Y print density is too low to detect, an add-on pattern is appended to print data of another color (C, M, K) to make an add-on pattern easier to detect.

[4] The parameters (d1 to d4) that determine repetition of an add-on pattern, which have been explained using FIGS. 8 to 11B, are changed to increase the number of add-on patterns (additional information size) per unit area, and the detected add-on patterns are integrated to make an add-on pattern easier to detect.

[5] An add-on pattern is generated by setting pixel values of unit dots each consisting of a plurality of pixels (e.g., 4×2 pixels) at a fixed value α, and is added to only Y print data. This method deteriorates image quality more than the aforementioned general information appending methods, but makes an add-on pattern easier to detect.

The add-on pattern itself is changed in methods [1] and [2], while the add-on pattern appending method is changed in methods [3], [4], and [5].

That is, the information appending method determination unit 3016 selects an add-on pattern appending method from the aforementioned basic information appending method and methods [1] to [5] on the basis of the density information 3018 detected by the density information detector 3019 in the printer engine 400, and controls the appending method switching unit 3006 and add-on pattern switching unit 3011.

More specifically, the information appending units 3007 to 3009 and the add-on pattern generators 3012 to 3014 are respectively set in correspondence with the basic information appending method and methods [1] to [5], and the appending method switching unit 3006 and add-on pattern switching unit 3011 respectively select one of the information appending unit 3007 to 3009, and one of the add-on pattern generators 3012 to 3014 in accordance with the method determined by the density information detector 3019.

For example, if the maximum density value of the Y component is low in the printer engine 400, appending method [1] or [2] is selected to make detection of an add-on pattern easy. Of course, if the maximum density value is equal to or lower than a predetermined value, appending method [3] can be selected. In this way, the appending method can be adaptively determined on the basis of the print density characteristics of the printer engine 400.

As described above, according to this embodiment, since the add-on pattern appending method is changed on the basis of the print density in the printer engine 400, an add-on pattern can be appended to an image signal so that it can be detected appropriately.

Note that the number of the information appending units and add-on pattern generators is not limited to three shown in FIG. 13. Likewise, the selectable appending methods are not limited to methods [1] to [5] mentioned above and the basic method, and any other methods can be adopted as long as they can be selected in accordance with the print density characteristics in the printer engine 400.

<Second Embodiment>

The second embodiment of the present invention will be described below.

The second embodiment is characterized in that the add-on pattern appending method is changed on the basis of a user's print density correction instruction. Since the system arrangement to which the second embodiment is applied is the same as that in the first embodiment, the same reference numerals denote the same parts, and a detailed description thereof will be omitted.

Figure 15:
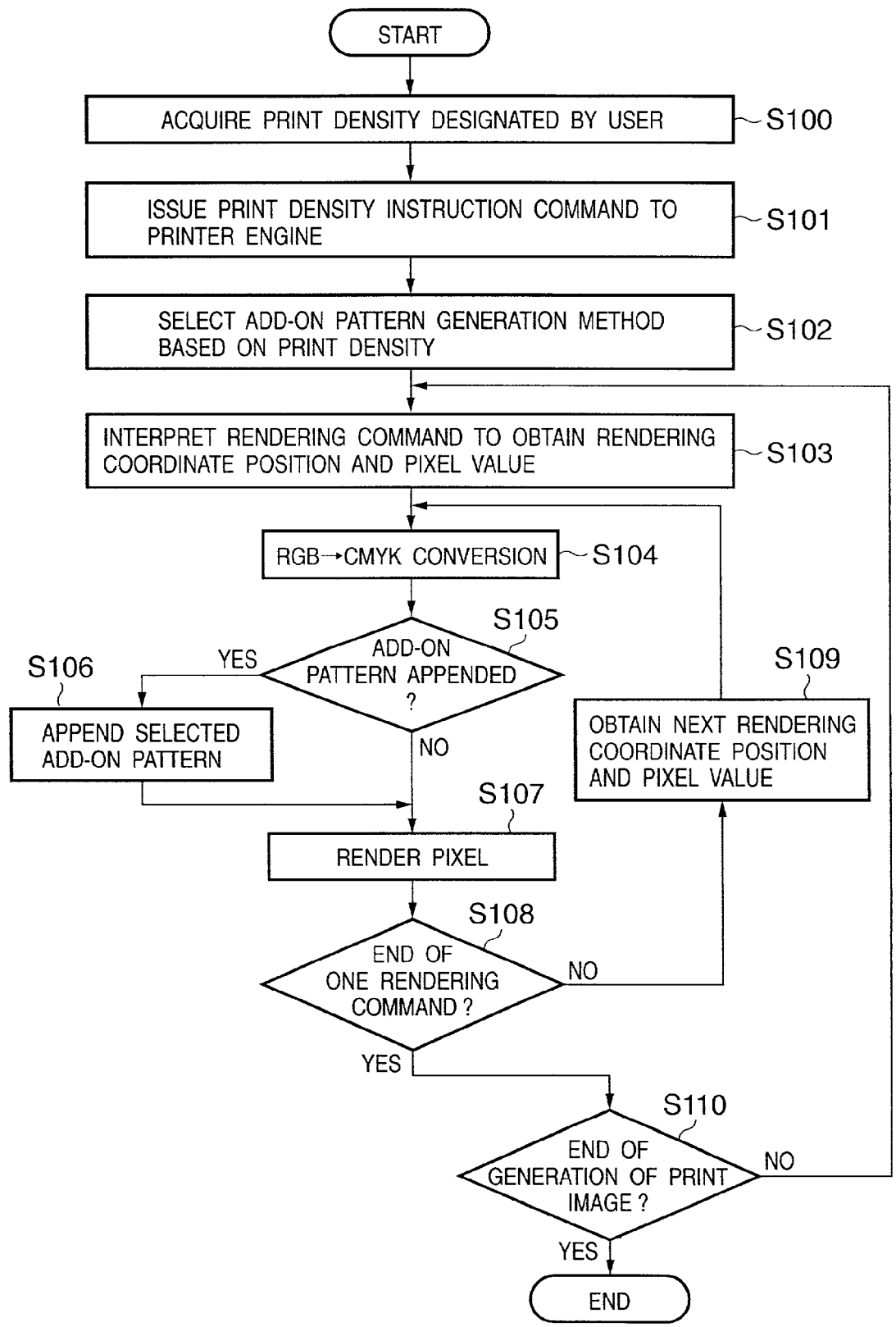
FIG. 15 is a flow chart showing an information appending process in the second embodiment.

FIG. 15 is a flow chart showing an add-on pattern appending method change process in the second embodiment. This process is controlled by the CPU 301 in the video controller 300.

In step S100, a density setting value that the user inputs at the control panel 309 of the printer main body or via the user interface of a printer driver in the host computer 100 to control the print density level in the printer engine 400 is read. That is, this process acquires a value for adjusting the print density value in the printer engine 400.

In step S101, the designated print density value (adjustment value) is passed to the printer engine 400, which issues a print density correction command to adjust the print density.

In step S102, an add-on pattern appending method is determined based on the designated print density. As the appending method, an appropriate one of methods [1] to [5] in the first embodiment is selected.

In step S103, a print command sent from the host computer 100 is interpreted. If a rendering command is found, the coordinate position to be rendered and its R, G, and B pixel values are obtained as an image to be rendered.

In step S104, the R, G, and B pixel values of the image to be rendered are converted into C, M, Y, and K pixel values.

It is checked in step S105 if the obtained coordinate position of the image to be rendered is the appending position of an add-on pattern. If it is determined that the obtained coordinate position of the image to be rendered is the appending position of an add-on pattern, the flow advances to step S106, and the add-on pattern is appended to the image to be rendered by the appending method selected in step S102.

In step S107, the pixel values of the image to be rendered are rendered on the image memory 306 irrespective of the presence/absence of an add-on pattern.

It is checked in step S108 if one rendering command is complete. If NO in step S108, the next rendering coordinate position and its pixel values are obtained in step S109 to repeat the processes from step S104. On the other hand, if one rendering command is complete, it is checked in step S110 if generation of a print image is complete. If NO in step S110, the flow returns to step S103 to repeat the aforementioned process.

As described above, according to the second embodiment, an optimal add-on pattern appending method can be selected in accordance with the print density characteristics designated by the user. In this way, predetermined additional information can be appended by a method of user's choice. Note that the second embodiment can be combined with the first embodiment mentioned above. That is, the add-on pattern appending method may be changed on the basis of the print density designated by the user, and that detected in the printer engine 400.

[Another Embodiment]

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, according to the present invention, an add-on pattern can be appended to image information so as not to deteriorate image quality and to decode the additional information more reliably.

As many apparently widely different embodiments of the present invention can be made without departing from the spirit and scope thereof, it is to be understood that the invention is not limited to the specific embodiments thereof except as defined in the claims.

What is claimed is:

1. An image forming apparatus having image forming means for forming an image on the basis of input image information, comprising:

a plurality of appending means for appending predetermined additional information to the input image information respectively by different methods;

density characteristic acquisition means for acquiring density characteristics of an image formed by the image forming means; and selection means for selecting one of said plurality of appending means on the basis of the acquired density characteristics.

2. The apparatus according to claim 1, wherein said density characteristic acquisition means acquires the density characteristics by detecting a density of an image formed by the image forming means.

3. The apparatus according to claim 1, further comprising instruction input means for inputting a user's instruction, and wherein said density characteristic acquisition means acquires the density characteristics on the basis of a density value set by the user's instruction.

4. The apparatus according to claim 1, further comprising instruction input means for inputting a user's instruction, and wherein said density characteristic acquisition means comprises:

first acquisition means for acquiring the density characteristics by detecting a density of an image formed by the image forming means; and second acquisition means for acquiring the density characteristics on the basis of a density value set by the user's instruction.

5. The apparatus according to claim 1, wherein said plurality of appending means append a predetermined pattern indicating the predetermined additional information to the image information respectively by different methods.

6. The apparatus according to claim 1, wherein said plurality of appending means differ a pattern indicating the predetermined additional information, and append different patterns to the image information.

7. The apparatus according to claim 6, further comprising a plurality of pattern generation means for generating different patterns indicating the predetermined information, and wherein said selection means selects one of said plurality of pattern generation means on the basis of the density characteristics.

8. The apparatus according to claim 1, wherein said plurality of appending means include:

first appending means for appending a predetermined pattern indicating the predetermined additional information; and second appending means for appending a pattern obtained by changing values of pixels that form the predetermined pattern.

9. The apparatus according to claim 1, wherein said plurality of appending means include:
first appending means for appending a predetermined pattern indicating the predetermined additional information; and
second appending means for appending a pattern obtained by changing a size of the predetermined pattern.

10. The apparatus according to claim 1, wherein said plurality of appending means include:
first appending means for appending a predetermined pattern indicating the predetermined additional information; and
second appending means for appending a pattern obtained by changing a shape of the predetermined pattern.

11. The apparatus according to claim 1, wherein said plurality of appending means include:
first appending means for appending the predetermined additional information to a predetermined color component of the image information; and
second appending means for appending the predetermined additional information to a color component different from the predetermined color component of the image information.

12. The apparatus according to claim 1, wherein said plurality of appending means include:
first appending means for appending a predetermined pattern indicating the predetermined additional information to the image information at a predetermined period; and
second appending means for appending the predetermined pattern to the image information at a period different from the predetermined period.

13. A method of controlling an image forming apparatus for forming an image on the basis of input image information, comprising:
the density characteristic acquisition step of acquiring density characteristics of an image formed by the image forming apparatus;
the determination step of determining an appending method of predetermined additional information to the input image information on the basis of the acquired density characteristics; and
the appending step of appending the predetermined additional information to the input image information by the determined appending method.

14. The method according to claim 13, wherein the determination step includes the step of selecting one of a plurality of appending methods on the basis of the density characteristics.

15. The method according to claim 13, wherein the density characteristic acquisition step includes the step of acquiring the density characteristics by detecting a density of an image formed by the image forming apparatus.

16. The method according to claim 13, wherein the density characteristic acquisition step includes the step of acquiring the density characteristics on the basis of a density value set by a user.

* * * * *

UNITED STATES PATENT AND TRADEMARK OFFICE
CERTIFICATE OF CORRECTION

| | |
|---|---|
| PATENT NO. | : 6,992,793 B2 |
| APPLICATION NO. | : 09/897032 |
| DATED | : January 31, 2006 |
| INVENTOR(S) | : Manabu Takebayashi |

It is certified that error appears in the above-identified patent and that said Letters Patent is hereby corrected as shown below:

COLUMN 5

Line 53, "are formed" should read --is formed--.

COLUMN 6

Line 52, "embedded." should read --embedded in the region B.--.

COLUMN 10

Line 11, "be appended" should read --to be appended--; and
   Line 51, "video controller 3005" should read --video controller 300--.

COLUMN 13

Line 35, "user's" should read --the user's--; and
   Line 46, "single" should read --single item of--.

COLUMN 14

Line 49, "append" should read --appends--;
   Line 53, "differ" should read --differs--; and
   Line 64, "include:" should read --includes:--.

UNITED STATES PATENT AND TRADEMARK OFFICE
CERTIFICATE OF CORRECTION

PATENT NO. : 6,992,793 B2
APPLICATION NO. : 09/897032
DATED : January 31, 2006
INVENTOR(S) : Manabu Takebayashi It is certified that error appears in the above-identified patent and that said Letters Patent is hereby corrected as shown below:

<u>COLUMN 15</u>

Line 5, "include:" should read --includes:--;
Line 12, "include:" should read --includes:--;
Line 19, "include:" should read --includes:--; and
Line 28, "include:" should read --includes:--.

Signed and Sealed this

Twenty-seventh Day of March, 2007

JON W. DUDAS
*Director of the United States Patent and Trademark Office*